United States Patent

La Falce et al.

[15] 3,689,887

[45] Sept. 5, 1972

[54] INFORMATION TRANSFER SYSTEM

[72] Inventors: Robert A. La Falce, Neptune; William M. Spencer, West End, both of N.J.

[73] Assignee: The Bendix Corporation

[22] Filed: June 11, 1970

[21] Appl. No.: 45,462

[52] U.S. Cl. .................340/163, 317/22, 340/409, 340/413
[51] Int. Cl. .............................................H04q 9/00
[58] Field of Search.................340/163, 409, 413

[56] References Cited

UNITED STATES PATENTS

3,444,521   5/1969   Breese.......................340/163
3,529,292   9/1970   Neill et al..................340/163
3,529,293   9/1970   Sullivan et al. ............340/163
3,543,267   11/1970  Morris........................340/413
3,559,177   1/1971   Benson.......................340/163

Primary Examiner—Donald J. Yusko
Attorney—S. H. Hartz and Plante, Hartz, Smith and Thompson

[57] ABSTRACT

An information transfer system uses coded signals identifying stations and commands for addressing selected stations and for performing selected commands on the selected stations to change their conditions. The stations are scanned continuously to determine their conditions, nd information is displayed to indicate only those stations in a predetermined condition.

26 Claims, 6 Drawing Figures

INFORMATION TRANSFER SYSTEM

The invention relates to information transfer systems and more particularly to such systems using remote controlled circuit breakers.

Heretofore, thermal circuit breakers were used for protecting electrical circuits in aircraft from overloads, and generators had to be oversize because the circuit breakers required high overload current capability. In large airplanes, where there are a thousand or more thermal circuit breakers of various current ratings, the control and protective circuitry time delays must be coordinated to meet the inherent inverse tripping curves of the circuit breakers. For example, in a system using a transformer-rectifier assembly with a thermal circuit breaker in the AC input and another in the DC output, the circuit breaker in the DC output must trip before the circuit breaker in the AC input and the current ratings of the circuit breakers must be selected accordingly.

Another disadvantage of thermal circuit breakers is that two wires are required for each circuit breaker and in large airplanes there may be 2000 wires or more through the flight deck. The wires must be sized to the circuit breaker rather than the load and this results in extra weight.

An attempt has been made to utilize remote controlled circuit breakers, but thermal circuit breakers were used heretofore for this purpose. Full size thermal circuit breakers were used in the load center and smaller circuit breakers were used in the flight deck. This arrangement required twice as many circuit breakers and an additional wire was required for each circuit breaker in the flight deck even though the wire was relatively small. Although the full sized circuit breakers were located in the load center, the interface wiring was still tailored to the circuit breakers and not to the loads and the electric power system was faced with the same coordination problems since the remote controlled circuit breakers were similar to the conventional thermal circuit breakers.

One object of the present invention is to provide a remote controlled circuit breaker system utilizing single point control for all circuit breakers.

Another object is to control the circuit breakers individually or in system groups.

Another object is to assign a number to each circuit breaker and provide a numbered keyboard on the flight deck of an aircraft for controlling all the circuit breakers at the load center.

Another object is to prevent false information from being transmitted when two or more keys are depressed simultaneously.

Another object is to provide a display to show tripped circuit breakers.

Another object of the invention is to simplify cockpit displays and controls.

Another object of the invention is to reduce interface problems between circuit breakers and the associated loads.

Another object is to reduce the length of feeder wires and to tailor wire sizes to load requirements.

Another object is to provide a more complete maintenance annunciator system by providing more monitoring points.

Another object of the invention is to utilize remote controlled circuit breakers which are not thermally responsive.

Another object is to provide highly reliable overload protection for electrical circuits.

Another object is to provide a reset inhibit which when actuated will prevent reset of any circuit breaker in the load center so that maintenance may be performed at the load center without injury to the workman.

Another object is to provide a remote controlled circuit breaker system which can be used with a load management system so that automatic load shedding and load restoration can be accomplished without appreciable additional equipment.

Another object is to provide a remote controlled circuit breaker system which is compatible with AIRCRAFT INTEGRATED DATA SYSTEM equipment.

Another object is to provide a remote controlled circuit breaker system which can be used to annunciate maintenance information.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

IN THE DRAWINGS

Figure 1:
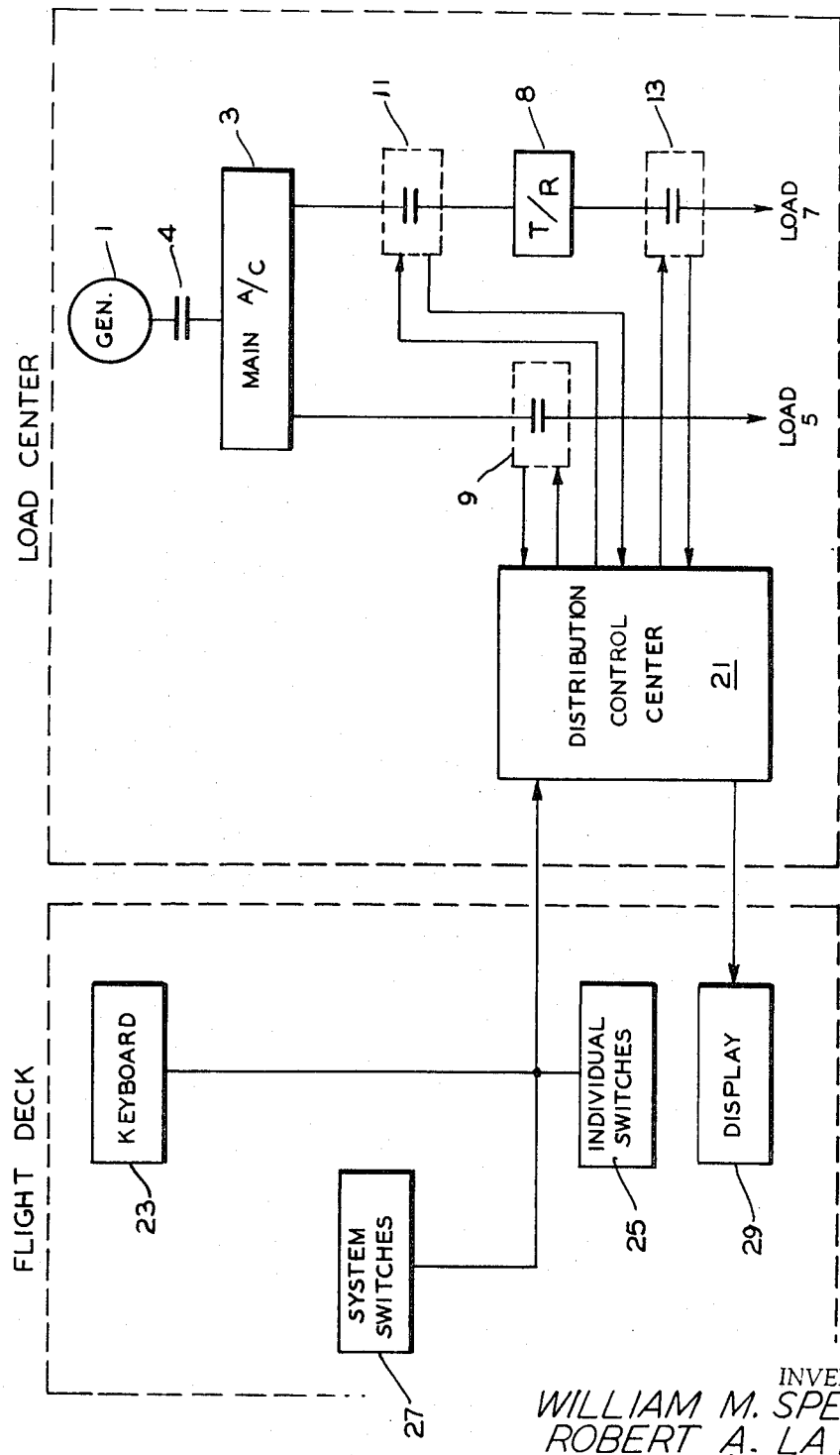
FIG. 1 is a simplified block diagram showing a remote controlled circuit breaker system constructed according to the invention and using single point control.

Referring to the drawings, a novel single point circuit breaker control system constructed according to the invention and especially adapted for use aboard aircraft is shown in the simplified block diagram in FIG. 1. The load center on the aircraft includes an alternating current generator 1 connected through a contactor 4 to a distribution main 3. An alternating current load 5 is connected to distribution main 3 through a remote controlled circuit breaker 9. A direct current load 7 is connected to distribution main 3 through a transformer rectifier 8. A remote controlled circuit breaker 11 is interposed in the line between distribution main 3 and transformer rectifier 8 and a remote controlled circuit breaker 13 is interposed in the line between transformer rectifier 8 and load 7.

The circuit breakers may be considered stations and preferably are of the two coil latching type for tripping and resetting the circuit breakers and each circuit breaker is assigned a coded number. The circuit breaker trip and reset coils are connected to a distribution control center 21 which receives digital signals corresponding to the coded numbers and commands from the flight deck of the aircraft to trip or reset the circuit breakers. The distribution control circuit also receives signals from fault detectors to automatically trip the circuit breakers when a malfunction occurs.

Coded numbers corresponding to the selected circuit breakers and to the commands to be performed thereon are supplied to the distribution control center 21 by a keyboard 23 or by individual switches 25, or by system switches 27. Keyboard 23 may be used for generating any coded number one digit at a time. Individual switches 25 generate complete coded numbers for particular circuit breakers, and system switches 27 generate a series of coded numbers for related groups of circuit breakers. After providing the coded numbers corresponding to the selected circuit breakers and commands in the manner described the selected circuit breakers are tripped or reset as commanded. Tripped circuit breakers are automatically detected and their coded numbers are displayed on a display 29 on the flight deck and the information is continuously updated.

Figure 2A:
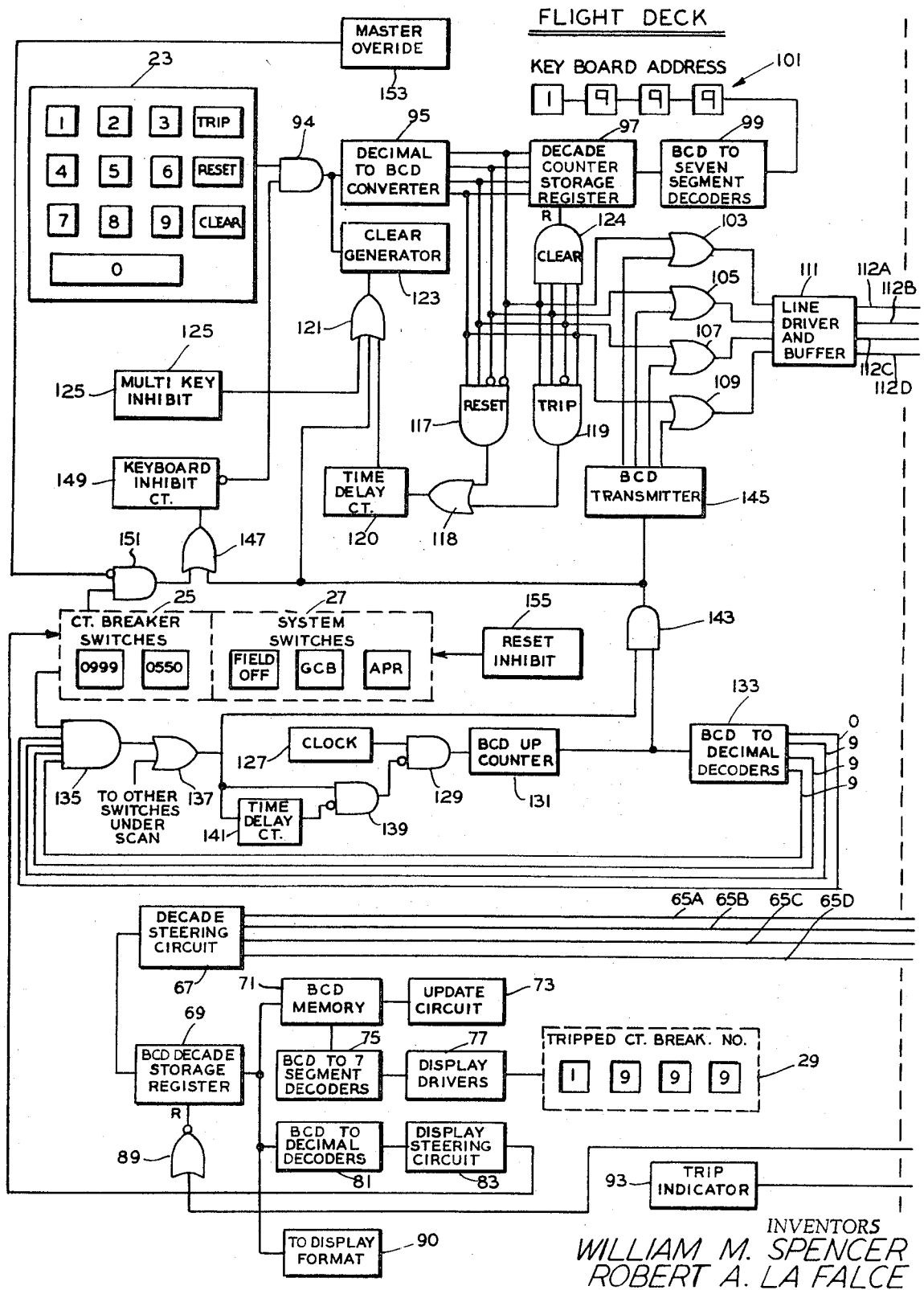
FIGS. 2A and 2B are more detailed block diagrams showing a system constructed according to the invention having remote controlled circuit breakers located in the load center and controlled from the flight deck.
Figure 2B:
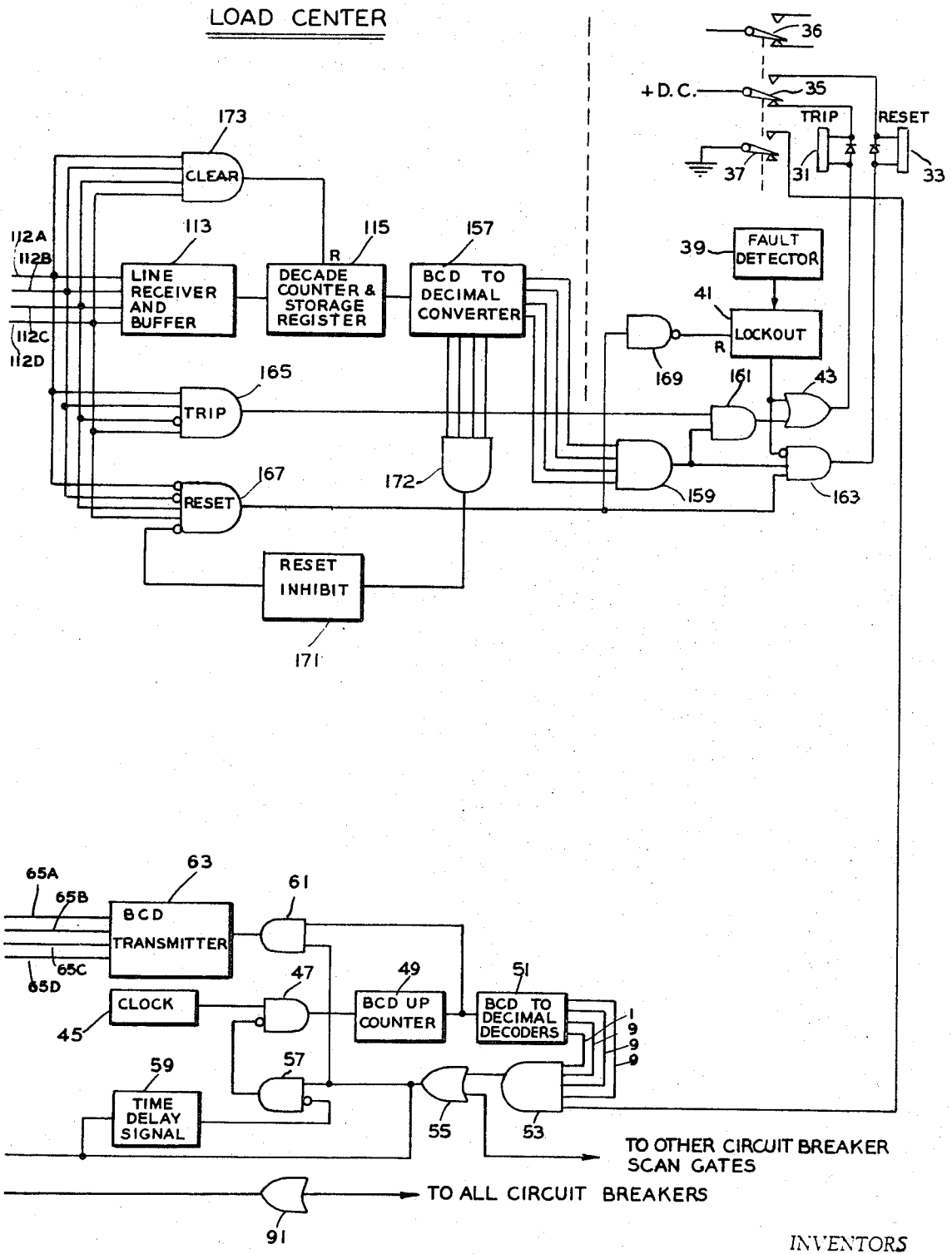

The system shown in FIG. 1 is shown in more detail in FIGS. 2A and 2B except that the distribution system including the generator and distribution main are not shown in FIGS. 2A and 2B. Each remote controlled circuit breaker includes a trip coil 31 and a reset coil 33 for operating contacts 35, 36 and 37. Contact 35 is connected to a voltage source, contact 37 is connected to ground, and contact 36 is connected in the line and corresponds to the contacts of one of the remote controlled circuit breakers 9, 11, 13 shown in FIG. 1. A fault detector 39 detects a malfunction in the line and provides a signal to a lockout circuit 41 connected to one input of an OR gate 43. OR gate 43 is connected to trip coil 31 and when a fault is detected by fault detector 39 the trip coil is energized by the voltage source through contact 35 and operates contacts 35, 37, 39 of the associated circuit breaker and opens the circuit having the malfunction. Lockout 41 also provides a signal to gate 163 connected to reset coil 33 and inhibits gate 163 so that reset coil 33 cannot be energized when a fault is present in the associated circuit. Each remote controlled circuit breaker includes a corresponding arrangement.

The circuit breakers at the load center are continuously scanned to locate a tripped circuit breaker and the tripped circuit breaker is identified by its coded number which is transmitted to an indicator 29 on the flight deck. To scan the circuit breakers and detect a tripped circuit breaker, a clock 45 provides pulses to one input of an AND gate 47. When AND gate 47 is not inhibited as described hereinafter, it passes the pulses to a BCD up-counter 49 which in the present arrangement continuously counts from 0 to 9,999. The output of BCD up-counter 49 passes to BCD to decimal decoders 51 which has one decoder for each decade, i.e., one for the thousands, one for the hundreds, one for the tens, and one for the units. The BCD to decimal decoders 51 produce 0 to 9 outputs for each decade. The thousand decoder produces outputs 0–9 in the thousand decade, the hundred decoder produces outputs 0–9 in the hundred decade, the ten decoder produces outputs 0–9 in the ten decade and the unit decoder produces outputs 0–9 in the unit decoder. The outputs from these decoders are combined to form any number from 0 to 9,999. An AND gate 53 is provided for each circuit breaker. Each AND gate 53 receives a number output from the decoder and a signal from the associated circuit breaker through contact 37 if it is tripped.

For example, if the circuit breaker under scan were numbered 1,999 the input to gate 53 from BCD to decimal decoders 51 would consist of 1 from the thousand decoder, 9 from the hundred decoder, 9 from the ten decoder and 9 from the unit decoder. If the circuit breaker 1,999 under scan were tripped all inputs would be present at AND gate 53 for gate 53 to produce an output to one input of an OR gate 55 whereupon OR gate 55 would produce an output to one input of a gate 57 and also actuate a time delay circuit 59 having its output connected to a second input of gate 57. Gate 57 is inhibited when time delay circuit 59 is not actuated, but during the time delay gate 57 produces an output which is applied to a second input of gate 47 and inhibits gate 47 from passing any more pulses from clock 45 to BCD up-counter 49 to stop the count at the coded number 1,999 of the tripped circuit breaker. The time delay is just long enough to transmit all information from the load center to the flight deck as described hereinafter. In one arrangement the time delay was selected as 200 microseconds, although any suitable time delay may be used.

The output from OR gate 55 also is applied to one input of an AND gate 61 having a second input connected to the output of BCD up-counter 49. The coded number 1,999 now stored in BCD up-counter 49 is passed by AND gate 61 to a BCD transmitter 63 for transmission to the flight deck over four wires 65A, 65B, 65C and 65D representing the 1, 2, 4 and 8 of the binary coded system.

Figure 3:
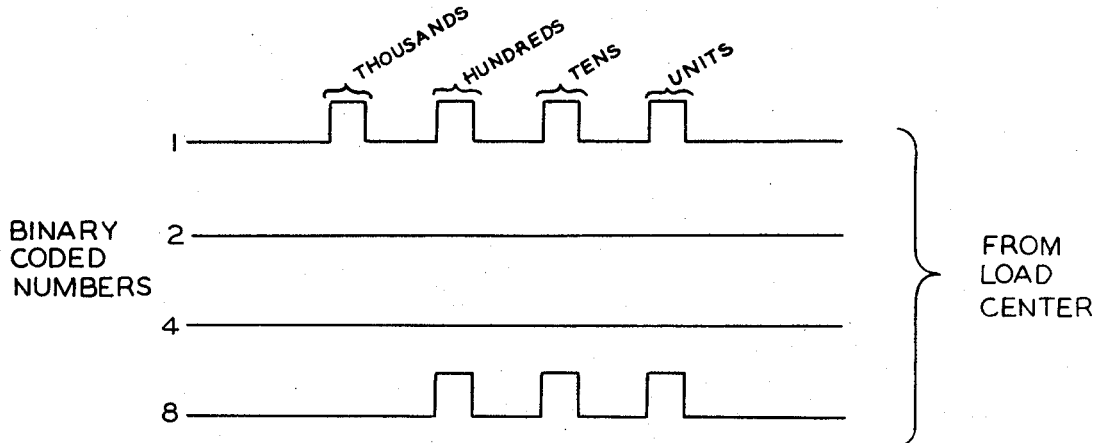
FIG. 3 shows typical digital information data transmission from the load center to the flight deck.

A typical digital data transmission from the load center to the flight deck is shown in FIG. 3 for the coded number 1,999. The thousand information is transmitted first, then the hundred, then the ten and then the unit. The coded number 1,999 is shown in FIG. 3, i.e., one for the thousand, one and an eight forming a nine for the hundreds, one and an eight forming a nine for the tens, and one and an eight forming a nine for the units.

Referring again to FIG. 2B the output of the BCD transmitter 63 is transmitted over the four wires 65A, 65B, 65C and 65D to a decade steering circuit 67, shown in FIG. 2A, connected to the input of a BCD decade storage register 69. The decade steering circuit 67 stores the thousands information in the thousand register of the BCD decade storage register, the hundreds in the hundred register, the tens in the ten register, and the units in the unit register.

The output of the BCD decade storage register 69 is applied to a BCD memory 71 which is periodically updated by an update circuit 73. The output of the BCD memory is applied to BCD to seven segment decoders 75 whose outputs are applied through display drivers 77 to seven segment display 29 which indicates the number of the tripped circuit breaker, in this case 1,999. The update circuit determines the frequency of updating BCD memory 71 which in one arrangement was selected as 5 seconds.

The output of BCD decade storage register 69 also is applied to BCD to decimal decoders 81 where the information is converted to decimal numbers. The BCD to decimal decoders 81 has one decoder for the thousands, one decoder for the hundreds, one decoder for the tens and one decoder for the units. The information in the BCD to decimal decoders is applied through a display steering circuit 83 to individual circuit breaker switches 25 or to system switches 27 to indicate by lights or other suitable means the switches which have been operated and the circuit breakers which have been tripped.

The output of OR gate 55 at the load center also is applied to a gate 89 at the flight deck having an output connected to the reset of BCD decade storage register 69. The BCD decade storage register 69 is maintained in reset position until a signal is received from OR gate 55 through gate 89 so that the number transmitted on the four wires 65A, 65B, 65C and 65D is recorded in BCD decade storage register 69.

The output of BCD decade storage register 69 may also be applied to a cathode ray tube or other type of display through suitable circuitry 90. Also each circuit breaker when tripped provides a signal to a gate 91 at the load center whose output is applied to a trip indicator 93 at the flight deck which lights when any circuit break is tripped. With the arrangement described, the recoded numbers of all tripped circuit breakers are shown on display 29 and on cathode ray tube 90 and the information is periodically up-dated.

The circuit breakers at the load center also can be controlled by commands from the flight deck. The remote controlled circuit breakers at the load center can be tripped or reset from the flight deck by means of a keyboard 23, individual switches 25 and system switches 27, such as generator field off, generator control breaker, auxiliary power relay, etc. Keyboard 23 has 10 numbered keys 0–9 and three command keys, trip, reset and clear. The output of keyboard 23 is applied through a gate 94 to a decimal to BCD converter 95 which converts the keyboard numbers to the corresponding binary coded system 1, 2, 4 and 8 for transmission to the load center as described hereinafter.

The output of the decimal to BCD converter 95 is applied to a decade counter storage register 97 where the information is steered to the proper storage register, i.e., the thousands in the thousand register, the hundreds in the hundred register, the tens in the ten register and the units in the unit register. The output of decade counter storage register 97 is applied to BCD to seven segment decoders 99 to indicate on keyboard address 101 the number transmitted from keyboard 23.

The output of decimal to BCD converter 95 also is applied through OR gates 103, 105, 107, 109 and a line driver and buffer 111 on the flight deck by four wires 112A, 112B, 112C and 112D through a line receiver and buffer 113 to a decade counter and storage register 115 at the load center. The information is steered to the proper storage registers as described above in connection with register 97.

For example, if circuit breaker 1,999 were addressed, as the 1 on the keyboard is depressed, the numeral 1 registers and appears on keyboard address 101 on the flight deck and a 1 is registered in register 115 at the load center. Likewise, numerals 999 are transmitted in sequence and appear on the keyboard address and are registered in register 115. Depending upon whether the circuit breaker is to be tripped or reset, the trip or reset key is depressed. A trip command is selected as BCD number 1,011 and a reset command as BCD number 1,100 and these numbers are applied to decimal to BCD converter 95 and are transmitted to the load center in the same manner as number 1,999 described above by depressing the trip or reset keys. A trip gate 119 at the flight deck is responsive only to BCD number 1,011 and a reset gate 117 at the flight deck is responsive only to BCD number 1,100 so that an output also appears either at trip gate 119 or reset gate 117 and is applied through an OR gate 118 and a time delay circuit 120 and an OR gate 121 to a clear generator 123 which produces an output corresponding to the BCD number 1,111. The output 1,111 from clear generator 123 is applied to decimal to BCD converter 95 at the flight deck and is transmitted to the load center in the same manner as trip and reset numbers 1,011 and 1,100. A clear gate 124 connected to the reset terminal of decade counter storage register 97 is responsive only to BCD number 1,111 and when a BCD clear signal 1,111 is applied to decimal to BCD converter 95 by clear generator 123 decade counter and storage register 97 is reset to 0 and keyboard address 101 is cleared. Also, information stored in register 115 at the load center is cleared in the manner described hereinafter so that another number may be entered and a command issued without first generating a clear. Time delay circuit 120 is provided to permit the trip or reset command to be effective before registers 97 and 115 are cleared.

The output of a multi-key inhibit 125 is applied through OR gate 121 to automatically operate clear generator 123 and transmit the BCD number 1,111 if two or more keys are depressed simultaneously to clear register 97 and keyboard address 101 at the flight deck and to clear register 115 at the load center. Multi-key inhibit 125 is an electronic sensing circuit which detects when two or more keys are depressed simultaneously. This arrangement avoids error by preventing the first key depressed from generating information.

Circuit breaker numbers may also be transmitted from individual circuit breaker switches 25 which provide the entire numbers of the corresponding circuit breakers, or by system switches 27 which provide the entire numbers of a series of corresponding circuit breakers connected in system configuration. When the switches are pushed in a trip command is given and when the switches are pulled out a reset command is given.

A scanning arrangement similar to that described above at the load center is used at the flight deck to detect the numbers of the switches which are operated. A clock 127 generates clock pulses through a gate 129 to a BCD up-counter 131 which continuously scans from 0–9,999. The output of BCD up-counter 131 is applied to BCD to decimal decoders 133 and the output of BCD to decimal decoders 133 is applied by four wires to the input of AND gate 135. A fifth input is applied to AND gate 135 by switches 25 and 27. For example, when individual circuit breaker switch 25 for transmitting numeral 0,999 is displaced and when BCD to decimal decoders 133 register the number 0,999, an output appears at gate 135 which is applied through an OR gate 137 to a time delay circuit 141 and to a gate 139 which provides an output during the time delay to inhibit gate 129 and stop the clock pulses from entering BCD up-counter 131 and stop the count of BCD up-counter 131 at 0,999. The output from gate 137 also is applied to an AND gate 143 which transmits the information 0,999 in the BCD up-counter 131 through BCD transmitter 145 and through OR gates 103, 105, 107 and 109 and line driver and buffer 111 at the flight deck, and through line receiver and buffer 113 to the decade counter and storage register 115 at the load center.

The output from AND gate 143 also is applied through an OR gate 147 to a keyboard inhibit circuit 149 connected to a second input of gate 94 and which when activated inhibits gate 94 and prevents transmission from keyboard 23. The output from AND gate 143 also is applied through OR gate 121 to clear generator 123 for clearing register 97 as described above. Gates 121 and 147 give priority to the individual circuit breaker switches 25 and system switches 27 over keyboard 23. If a number is being programmed on the keyboard, the instant an individual circuit breaker switch 25 or a system switch 27 is actuated, the output from gate 143 actuates clear generator 123 to clear the information in keyboard address 101 and to clear any information stored in decade counter and storage register 97 at the flight deck and decade counter and storage register 115 at the load center so that information from switches 25 or 27 can be transmitted to the load center.

Gates similar to gate 135 have their inputs connected to the other switches 25, 27 and to the outputs of BCD to decimal decoders 133 and have their outputs connected to the input of gate 137.

In some instances it may be convenient to have certain circuit breakers controlled by the individual circuit breaker switches 25, and certain system switches controlled by system switches 27 numbered below 1,000 and prevent entry of numbers below 1,000 by the keyboard. With this arrangement a gate 151 having one input connected to certain individual circuit breaker switches 25 and certain system switches 27 and its output connected to OR gate 147 prevents entry of numbers below 1,000 into register 95 from the keyboard by operating keyboard inhibit 149 so that the operator cannot control the circuit breakers numbered below 1,000 from the keyboard. If it is desired to have the keyboard 23 control the circuit breakers numbered below 1,000 a master override key 153 connected to a second input of gate 151 must be depressed to inhibit gate 151 from operating keyboard inhibit 149.

A reset inhibit 155 is connected to systems switches 27 at the flight deck and which when depressed provides a reset inhibit signal to the load center. The reset inhibit 155 is connected to system switches and provides the coded number 9,998 through gates 103, 105, 107 and 109 and line driver and buffer 111 at the flight deck and through line receiver and buffer 113 to decade counter and storage register 115 to prevent any tripped circuit breakers at the load center from being reset as described hereinafter while maintenance work is being performed in the load center to avoid injury to the workmen. Reset inhibit 155 does not prevent circuit breakers from being tripped, but only from being reset.

Figure 4A:
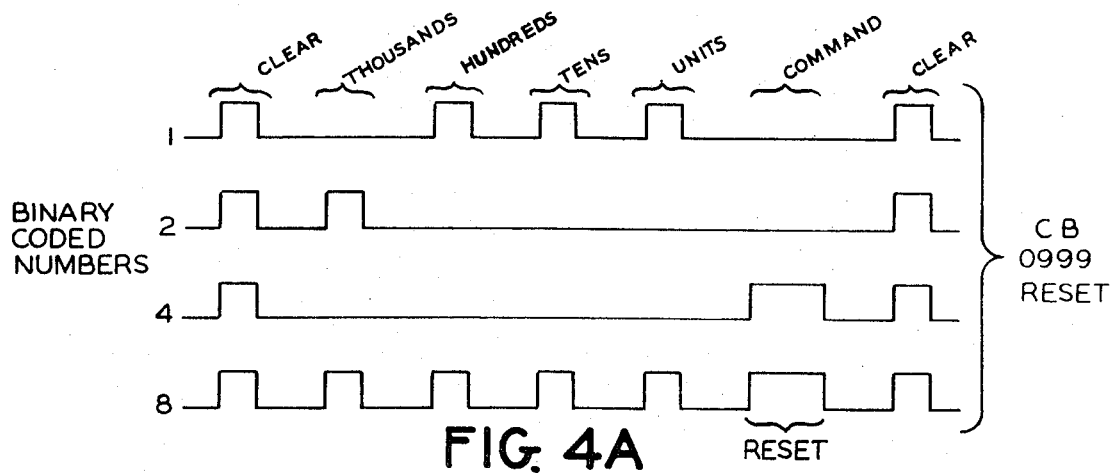
FIGS. 4A and 4B show typical digital command data transmissions from the flight deck to the load center.
Figure 4B:
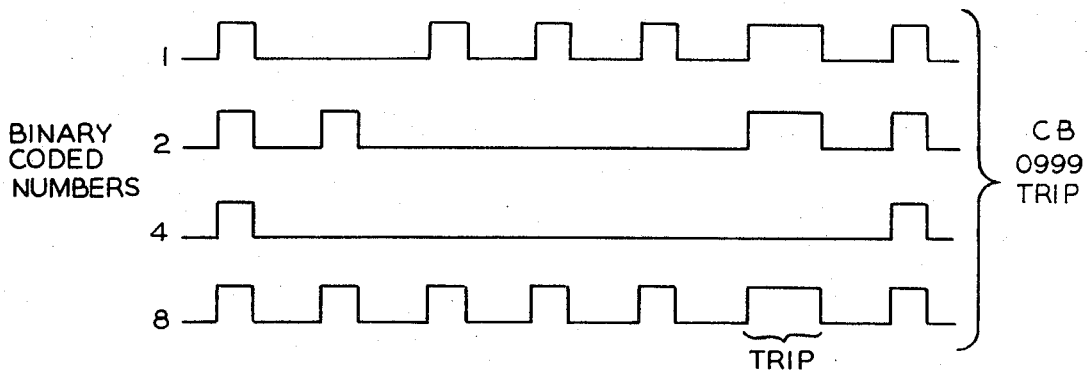

A typical binary code transmission from the flight deck to the load center is shown in FIGS. 4a and 4b. When a command is issued the first command is a clear signal which in the system described is the BCD number 1,111. The BCD number 1,111 is comprised of a binary 1, a binary 2, a binary 4 and a binary 8 and a pulse appears on each of the four wires 112A, 112B, 112C and 112D as shown in FIGS. 4a and 4b. The BCD number 1,111 was chosen so that if a transient is picked up on all four wires a clear signal will be transmitted and the system will not operate falsely.

After the clear signal the thousands, then the hundreds, then the tens, and finally the units information is transmitted and if circuit breaker number 0,999 is selected a binary 2 and a binary 8 is used as the 0 for the thousands, a binary 1 and a binary 8 comprises hundreds, a binary 1 and a binary 8 comprises the tens and a binary 1 and a binary 8 comprises the units.

The next signal is a command either trip or reset. A reset command is BCD number 1,100 which comprises a binary 4 and a binary 8 as shown in FIG. 4a. A trip command is BCD number 1,011 and comprises a binary 1, a binary 2 and a binary 8 as shown in FIG. 4b.

After the reset or trip command a clear command BCD number 1,111 comprising a binary 1, a binary 2, a binary 4 and a binary 8 is issued automatically so that a new command may be transmitted. The total transmission time of the first five bits of information, that is, the clear, the thousands, the hundreds, the tens and the units may take approximately 240 microseconds and the reset or trip command may take 30 milliseconds which is considered long enough for the circuit breaker to respond to the command. It should be understood, however, that the transmission times can be any suitable value.

It has been found convenient to use 28 volts for transmitting signals but this too can be varied as desired. One advantage of using a voltage this high is that transients are likely to be below this amplitude and will not give false commands.

As described above, information from the flight deck is transmitted by line driver and buffer 111 through four wires 112A, 112B, 112C and 112D to line receiver and buffer 113 to decade counter and storage register 115 at the load center where the information is stored. The information from storage register 115 is converted to decimal numbers by a BCD to decimal converter 157. The output of the converter 157 is transmitted to a gate 159 as a circuit breaker number.

If the circuit breaker being addressed has the number 1,999 then BCD to Decimal Converter 157 provides a 1 from the thousands, a 9 from the hundreds, a 9 from the tens and a 9 from the units to the input of gate 159. The output from gate 159 is applied to an input of each of gates 161 and 163. A second input of gate 161 is connected to the output of a trip gate 165 which provides an output only when trip command BCD number 1,011 appears at its input from line driver and buffer 111. A second input of gate 163 is connected to the output of reset gate 167 which provides an output only when reset command BCD number 1,100 appears at its input from line driver and buffer 111. A trip command provides an output from gate 161 being addressed, in this case 1,999, which is applied through gate 43 to energize trip coil 31 of the circuit breaker and operates contacts 35, 37, 39 as described above. A reset command provides an output from gate 163 which is applied to reset coil 33 of the circuit breaker.

The circuit breaker is prevented from resetting even in the presence of a reset command at the output of gate 167 if a fault is detected in the associated circuit by fault detector 39. Fault detector 39 sets lockout 41 so that its output inhibits gate 163 to prevent energization of reset coil 33. Lockout 41 cannot be reset until the applied reset signal from gate 167 through gate 169 is removed. Gates 167 and 169 make the remote circuit breaker anti-cycle. A reset inhibit 171 is actuated by a gate 172 when number 9,998 is transmitted from BCD to decimal converter 157 and inhibits gate 167 to prevent resetting the associated circuit breaker. A gate 173 having its input connected to line driver and buffer 111 and its output connected to the reset terminal of decade counter and storage register 115 provides an output only when clear BCD number 1,111 is transmitted from the flight deck to reset register 115.

From the above description it will be apparent that the scan mechanism in the load center sequentially transmits information on four wires 65A, 65B, 65C, 65D to a BCD decade storage register 69 on the flight deck. The information is decoded to annunciate the tripped circuit breaker on display 29. A fifth wire connecting the output of gate 55 to the input of gate 89 maintains storage register 69 on the flight deck continuously reset until a tripped circuit breaker is detected. When a circuit breaker is tripped a sixth wire connecting gate 91 to trip indicator 93 provides a signal to light the trip indicator. Commands from the flight deck are transmitted sequentially by four wires 112A, 112B, 112C and 112D to the load center. Only 10 wires are used to control and annunciate up to 10,000 or more circuit breakers.

The remote control circuit breaker system constructed according to the invention and described herein has many additional advantages some of which are single point control, four digit seven segment displays for circuit breaker annunciation, individual circuit breaker displays and a cathode ray tube display to indicate tripped circuit breakers. Commands may be transmitted by means of keyboard 23, individual circuit breaker switches 25 or system switches 27. A multikey inhibit 125 with electronic sensing prevents false information from being transmitted when two or more keys are depressed. A master override 153 controls switches which are normally not accessible through keyboard 23. Reset inhibit 155 prevents reset of any circuit breaker in the load center so that maintenance work may be performed at the load center without danger of injury to the workmen. By using fault sensing circuits, the circuit breakers have a trip-free feature whether controlled by the keyboard or the individual or systems circuit breaker switches. The system can be used with any load management system by ascribing suitable coded numbers to the command functions and to the stations on which the commands are performed. The system is compatible with AIRCRAFT INTEGRATED DATA SYSTEM equipment and can be used for maintenance annunciator information transfer. In fact, any information whatsoever may be transmitted from the load center to the flight deck or from the flight deck to the load center by assigning a number to that particular bit of information.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An information transfer system for initiating commands at a control station and for changing the conditions of a plurality of operating stations remote from the control station in accordance with the commands, comprising means at the control station for generating binary coded signals corresponding to characters identifying the stations and commands, means for connecting the signal generating means to the operating stations including a number of lines corresponding to the maximum number of bits in the binary coded signals required to define a character for identifying the stations and commands and means connected to the binary coded signal generating means for transmitting the binary coded signals bit parallel character serial from the signal generating means via the connecting means to the stations, and means associated with the stations and connected to the connecting means and responsive to the binary coded signals for identifying the stations and operating the stations in accordance with the commands.

2. An information transfer system as described in claim 1 in which the binary coded signals are binary coded decimals and the connecting means comprises four lines.

3. An information transfer system as described in claim 2 in which the means associated with the stations includes a decade counter and storage register connected to the connecting means and a binary coded decimal to decimal converter connected to the storage register and providing outputs for addressing the stations.

4. An information transfer system as described in claim 3 having gating means connected to the stations and to the binary coded decimal to decimal converter and responsive to the output therefrom for identifying the stations in accordance with the coded signals.

5. An information transfer system as described in claim 1 in which the stations are remote controlled circuit breakers with means for tripping and resetting the circuit breakers in response to commands.

6. An information transfer system as described in claim 5 having fault detecting means associated with the circuit breakers for automatically tripping a circuit breaker in a circuit when a fault occurs in that circuit.

7. An information transfer system as described in claim 5 having means for inhibiting a circuit breaker from being reset in response to a reset command.

8. An information transfer system as described in claim 6 having lockout means operated by the fault detector to prevent the circuit breaker from being reset in response to a command while the fault is present in the associated circuit.

9. An information transfer system as described in claim 1 having indicating means connected to the means for generating coded signals for visually indicating the characters of the station addressed.

10. An information transfer system as described in claim 1 in which the means for generating coded signals includes a keyboard which provides signals corresponding to decimal numbers, and a decimal to binary coded decimal converter connected to the keyboard for converting the decimal numbers to binary coded decimals.

11. An information transfer system as described in claim 10 which includes indicating means for visually indicating the station addressed comprising a storage register connected to the decimal to binary code decimal converter, a binary code decimal to seven segment decoder connected to the storage register, and a keyboard address connected to the decoder for visually indicating the decimal number of the station addressed.

12. An information transfer system as described in claim 11 which includes means for automatically clearing the storage register after each command.

13. An information transfer system as described in claim 12 in which the means for automatically clearing the storage register includes means for initiating binary coded decimal signals corresponding to a clear command following the coded signals corresponding to the command, and means connected to the last mentioned means and responsive to the signals corresponding to the clear command for resetting the storage register.

14. An information transfer system as described in claim 1 in which the means for generating coded signals include switches, and means connected to the switches for scanning the switches and detecting operation of the switches and providing coded signals corresponding to characters identifying a station.

15. An information transfer system as described in claim 14 in which the means for scanning the switches comprises clock means for providing pulses, a counter connected to the clock means for counting the pulses, means for detecting operation of the switches connected to the counter and to the switches for stopping the count of the counter at the number of a station to be commanded by the switch.

16. An information transfer system as described in claim 1 in which the stations are arranged in system configurations and the means for generating coded signals are switches which generate coded signals corresponding to the system configurations, and means connected to the switches for scanning the switches and detecting operation of the switches and providing coded signals corresponding to characters identifying the stations in the system configurations.

17. An information transfer system as described in claim 16 in which means for scanning the switches comprises clock means for providing pulses, a counter connected to the clock means for counting the pulses, means for detecting operation of the switches connected to the counter and to the switches for stopping the counts of the counter at the numbers of the stations in the system configuration to be commanded by the switch.

18. An information transfer system as described in claim 1 in which the means for generating coded signals includes a keyboard and system switches, and means controlled by the system switches is provided for automatically inhibiting operation of the keyboard when the system switches are operated.

19. An information transfer system as described in claim 18 including manually operated means connected to the keyboard operation inhibiting means for overriding the keyboard inhibiting means to permit operation of the keyboard.

20. An information transfer system as described in claim 1 in which the means for generating coded signals includes a keyboard and a storage register and the information transfer system further includes means to detect inadvertent operation of two or more keys of the keyboard, and means controlled by the key operation detection means for automatically clearing the register when two or more keys are operated inadvertently to prevent transmission of false information.

21. An information transfer system as described in claim 1 which includes means for generating coded signals corresponding to a clear command for clearing the register, the coded signals consisting of a pulse on each of the lines of the connecting means so that inadvertent energization of all the lines clears the register and avoids false commands.

22. In a system for automatically transferring information from a plurality of operating stations to station condition display means remote from the stations, each of the stations having means for providing signals corresponding at least to one of its conditions, means associated with the stations for continuously scanning the stations for condition information including means for automatically generating binary coded signals corresponding to characters identifying the stations, means for connecting the scanning means and the display means including a number of lines corresponding to the maximum number of bits in the binary coded signals required to define a character for identifying the stations, and means responsive to the binary coded signals and to the signals from the station condition means for transmitting the binary coded signals from the scanning means bit parallel character serial via the connecting means to the display means, and the display means including means responsive to the binary coded signals for operating the display means to indicate the conditions of the stations.

23. An information transfer system as described in claim 22 in which the scanning means includes time delay means controlled by the means responsive to the coded signals and to the station condition signals for momentarily delaying the coded signal generating means at a coded signal corresponding to a station in a predetermined condition for transmission to the display means.

24. An information transfer system as described in claim 22 in which the means for scanning stations comprises clock means for providing pulses, a counter connected to the clock means for counting the pulses and providing binary coded signals corresponding to the count and means connected to the counter and to the station condition signal means for stopping the count of the counter at the number of a station in a predetermined condition to identify the station.

25. An information transfer system as described in claim 24 in which the means for displaying information comprises means for displaying the characters at which the counter stops to identify the station in the predetermined condition.

26. In combination, an information transfer system as described in claim 1 and a system for automatically transferring information in which each system operates independently of the other and in which a station condition display means is located at the control station.

* * * * *